US007811460B2

(12) United States Patent
Haught et al.

(10) Patent No.: US 7,811,460 B2
(45) Date of Patent: Oct. 12, 2010

(54) PROCESS AND APPARATUS FOR REMOVAL OF BIOCOLLOIDS FROM WATER

(75) Inventors: Roy C. Haught, Independence, KY (US); Pratim Biswas, Chesterfield, MO (US); Pramod Kulkami, Port Jefferson Station, NY (US)

(73) Assignee: U.S. Environmental Protection Agency, Washington, DC (US)

( * ) Notice: Subject to any disclaimer, the term of this patent is extended or adjusted under 35 U.S.C. 154(b) by 782 days.

(21) Appl. No.: 11/368,414

(22) Filed: Mar. 7, 2006

(65) Prior Publication Data

US 2007/0210009 A1 Sep. 13, 2007

(51) Int. Cl.
*C02F 1/48* (2006.01)

(52) U.S. Cl. ................................................ 210/748.01

(58) Field of Classification Search ................ 210/748, 210/739, 616, 617, 748.01
See application file for complete search history.

(56) References Cited

U.S. PATENT DOCUMENTS 3,933,629 A * 1/1976 Smith ......................... 210/618
4,048,068 A 9/1977 Hirs
4,168,228 A 9/1979 Mallatt et al.
4,172,781 A 10/1979 Walk et al.
5,308,586 A * 5/1994 Fritsche et al. .............. 204/562
5,419,816 A * 5/1995 Sampson et al. ............ 205/556
5,843,308 A 12/1998 Suozzo et al.
5,997,750 A * 12/1999 Rozelle et al. .............. 210/744
6,110,374 A 8/2000 Hughes
6,140,040 A 10/2000 Palm et al.
6,180,016 B1 1/2001 Johnston et al.
6,524,477 B1 2/2003 Hughes
6,780,306 B2 * 8/2004 Schlager et al. ............. 205/701
6,866,704 B2 3/2005 Koslow
6,872,305 B2 3/2005 Johnson et al.
6,875,357 B1 4/2005 Mikkelson et al.
2003/0159932 A1 8/2003 Betts et al.

OTHER PUBLICATIONS

Fogel, D. et al, "Removing *giardia* and *Cryptosporidium* by Slow Sand Filtration." J. AWWA, 1993, vol. 88, pp. 77-84.
Frey, M.M. et al, "Critical Evaluation of *Cryptosporidium* Research and Research Needs." AWWA Research Foundation and American Water Works Association, Denver, Co. 1995.
Huck, P.M. et al, "Effects of Filter Operation in *Cryptosporidium* Removal" J. AWWA 2002, vol. 94, pp. 97-111.
Ongerth, J.E. et al "Testing of Diatomaceous Earth Filtration for Removal of *Cryptosporidium* oocysts." J. AWWA, 2001, vol. 93, pp. 54-63.
Plummer, J.D. et al, "Removing *Cryptosporidium parvum* by Dissolved Air Flotation" J. AWWA, 1995, vol. 87, pp. 85-95.

* cited by examiner

*Primary Examiner*—Walter D Griffin
*Assistant Examiner*—Cameron J Allen
(74) *Attorney, Agent, or Firm*—George A. Loud; Bacon & Thomas, PLLC

(57) ABSTRACT

Biocolloids, e.g. *Cryptosporidium parvum* oocysts, are removed from water by filtration using a packed bed of a granular filter medium, preferably MgO, establishing an electric field across the packed bed, perpendicular to the flow of the water through the packed bed. The packed bed is provided in an annular space between two concentric electrodes.

11 Claims, 7 Drawing Sheets

PROCESS AND APPARATUS FOR REMOVAL OF BIOCOLLOIDS FROM WATER

BACKGROUND OF THE INVENTION

1. Field of the Invention

The field of the present invention is the purification of drinking water by removal of biocolloids including protozoan parasites.

2. The Prior Art

*Cryptosporidium parvum* is a protozoan parasite commonly found in surface waters contaminated with sewage and animal wastes, such as streams, lakes and rivers. The life cycle of *Cryptosporidium* includes the formation of oocysts, which are excreted in the stools of infected individuals. Infection occurs with the oral ingestion of oocysts in contaminated water. Oocysts have been shown to be highly environmentally resistant and are capable of withstanding various drinking water filtrations and chemical treatments such as chlorination. There have been six major outbreaks of cryptosporidiosis in the U.S. that have resulted from contaminated drinking water, all of which occurred in communities in compliance with all state and federal drinking water standards.

Existing drinking water regulations require public water systems that use surface water sources and provide filtration to achieve at least a 99 percent (2-log) removal of *Cryptosporidium*. These regulations are adequate for the majority of public water systems; however a subset of systems with higher vulnerability to *Cryptosporidium* exists, including those systems with the highest source-water *Cryptosporidium* levels. For those systems, additional treatment is necessary.

The removal of *Cryptosporidium* from drinking water is currently achieved through the use of filtration systems. Operational failure of these filtration units has been recognized as one of the causes responsible for outbreaks of *Cryptosporidium parvum* in water treatment systems. Suboptimal coagulation pretreatment has been found to decrease the *Cryptosporidium* removal by orders of magnitude. While conventional filtration can give a high degree of removal, there are a number of operational parameters that need to be optimized for successful operation of filtration systems, in particular, the coagulation system.

The conventional treatment for the removal of *Cryptosporidium parvum* oocysts generally consists of a series of processes including coagulation, flocculation, sedimentation and filtration. Direct filtration, which is typically used on sources with low particulates levels, includes coagulation and filtration, but not sedimentation. Other common filtration processes include slow sand, diatomaceous earth, membranes, and bag and cartridge filters. The effectiveness of conventional and direct filtration treatments has been shown to be dependent on the pretreatment effectiveness (i.e., optimal coagulation), as well as particle size and concentration. Conventional treatment practices are generally capable of meeting 2 to 3-$\log_{10}$ removals in most of the cases subject to optimal pretreatment (Huck, P. M. et al., "Effects of filter operation in *Cryptosporidium* research and research needs." AWWA Research Foundation and American Water Works Association, Denver, Colo. 1995). Alternative technologies such as diatomaceous earth filtration (Ongerth, J. E and Pecorato, J. P. "Testing of diatomaceous earth filtration for removal of *Cryptosporidium* oocysts." J. AWWA, 2001, vol. 93, pp. 54-63.), dissolved air flotation (Plummer, J. D. et al., "Removing *Cryptosporidium parvum* by dissolved air flotation." J. AWWA, 1995, vol. 87, pp. 85-95.), and slow sand filtration (Fogel, D. et al., "Removing *giardia* and *Cryptosporidium* by slow sand filtration." J. AWWA, 1993, vol. 88, pp. 77-84.) seem capable of achieving comparable, or even greater, levels of *Cryptosporidium* removal.; however, issues such as flow rate (diatomaceous earth filtration), filtrate turbidity (dissolved air flotation), and water temperature (slow sand filtration) have been shown to affect optimal performance of these methods. Of the methods available to the drinking water industry, membrane processes provide the most satisfactory removal of *Cryptosporidium parvum*; however these systems have been prohibitively expensive for large public supply systems (Frey, M. M. et al., "Critical evaluation of *Cryptosporidium* research and research needs." AWWA Research Foundation and American Water Works Association, Denver, Colo. 1995). Highly variable treatment performance has been observed for bag and cartridge filtration systems, depending on the particular filter tested.

SUMMARY OF THE INVENTION

It is an object of the present invention to provide a pretreatment for water to remove biocolloids, especially *Cryptosporidium* oocysts, which pretreatment is more reliable than current coagulation-based methods.

Another object is to provide for removal of small particles, such as *Cryptosporidium* spores, more effective than conventional filtration methods, without sensitivity to variations in particle size or concentration.

Yet another object is to augment conventional treatment methods in situations where coagulation-based pretreatments would not be practical, such as groundwater treatment.

Still another object of the present invention is to provide an apparatus for practice of the pretreatment for biocolloid removal.

Accordingly, the present invention provides a method for treating water, especially drinking water, to remove biocolloids having a surface charge including providing a packaged bed of a granular media in an annular space defined between two concentric cylindrical electrodes, the packed bed having an inlet and outlet, introducing the water onto the inlet side of the packed bed to create a flow of water through the packed bed, whereby water with a reduced biocolloid content exits through the packed bed outlet; and applying a DC electric voltage across the electrodes to create a DC electric field through the packed bed to enhance capture of the biocolloids by the packed bed.

Preferably, the applied DC voltage is a constant DC voltage.

The present invention also provides for rejuvenating the packed bed by backflushing, i.e. by introducing water into the outlet while simultaneously reversing the polarity of the applied voltage to force the biocolloids away from the granular media for removal of the biocolloids through the inlet, thereby rejuvenating the granular media.

Preferably, the flow of water through the packed bed is substantially constant and substantially bubble-free.

In another aspect the present invention provides an electrofilter apparatus including inner and outer concentric cylindrical electrodes defining an annular space therebetween, a packed bed of granular filter media supported of at bottom surface within the annular space and having a horizontal upper surface, a housing containing the inner cylindrical electrode and the packed bed and defining a central vertical axis, an inlet on the housing for feeding water to be treated onto the upper surface of the packed bed, an outlet on the housing for removal of treated water exiting the bottom surface of the packed bed, whereby a water flowpath, generally parallel to the vertical axis and generally linear, is established between the inlet and the outlet, and a power source supplying a voltage between the cylindrical electrodes and establishing an electrical field extending through the packed bed perpendicular to the vertical axis and water flowpath.

Consistent with the objective of providing generally linear flow (top to bottom or inlet to outlet) through the packed bed, the inner and outer cylindrical electrodes are preferably impervious to liquids, i.e. without pores or holes which would allow the passage of liquid therethrough.

Currently, MgO is the preferred granular filter media. The granular filter media preferably has a positive zeta potential greater than 1.0 mV and preferably greater than 10 mV.

The present invention provides much higher filtration efficiencies for biocolloid removal from drinking water than any of the prior art apparatus and methodologies for removal of biocolloids. To provide these higher efficiencies the present invention exploits, not only the electrophoretic velocity of the biocolloids, but also the cross-flow electrosmotic velocities resulting from the motion of fluid in the pore interstices. The combined action of electroosmotic flow velocities and electrohpretic velocities of the biocolloids results in higher capture efficiencies of the biocolloids. In summary, due to the apparatus configuration and the combination of electrical mobility and other mechanisms such as diffusion, inertia and interception—the resultant capture is very high.

The present invention offers a further advantage over conventional filtration in that the removal efficiency in the presence of an electric field is relatively insensitive to variation in particle size and concentration. As a result, biocolloids of various sizes, including *Cryptosporidium parvum* oocysts, can be removed with relatively high efficiency. The invention can be readily adapted to augmentation of existing water treatment plants. Also, it can be particularly useful in the treatment of groundwater, where chemical coagulation-based systems would be impractical and undesirable. In addition, the invention has potential application in rural package treatment units, especially in light of their potential for economical operation using solar or wind energy sources.

The removal efficiencies are also significantly increased due to the perpendicular direction of flow of the macroscopic field (in the absence of media), together with the increased redistribution of local field with the presence of granular media.

Yet another advantage of the present invention is that it eliminates any need for use of a coagulant or flucculant.

The present invention shows particular promise in the removal of *Cryptosporidium parvum* oocysts.

The term "packed bed" is used herein in its conventional sense and refers to a mass of the granular filter media in which the media granules are in contact and remain substantially stationary as the water passes downward therethrough.

The term "biocolloid" as used herein refers to a biological (life form or debris thereof) colloid. "Colloid" is used in the conventional sense, e.g. referring to a particle size of about 0.1 to 0.001 micron.

DESCRIPTION OF THE PREFERRED EMBODIMENTS

A charged colloidal particle, in the presence of an electric field, experiences a force proportional to its charge and the electric field. This additional migration velocity, which adds a component of motion relative to the fluid streamlines and which results in an increased probability of deposition is attributable to the electrokineteic transport of the biological colloids in an externally applied electric field capitalizes on the fact that most biological colloids in nature possess a small surface charge that enable them to acquire small drift velocities in an electric field. The maximum improvement in collector efficiency is observed when the application of the electric field is oriented perpendicular to the macroscopic-flow direction. The present invention exploits two aspects of electrokinetics: (1) increased probability of deposition of colloidal particles on the filter media due to additional electrophoretic velocity when suspended in an external electric field, and (2) cross-flow electroosmotic velocity of fluid (in this case water) in the pore interstices that results in further enhancement in probability of deposition of colloidal particles on the filter media.

Figure 1B:
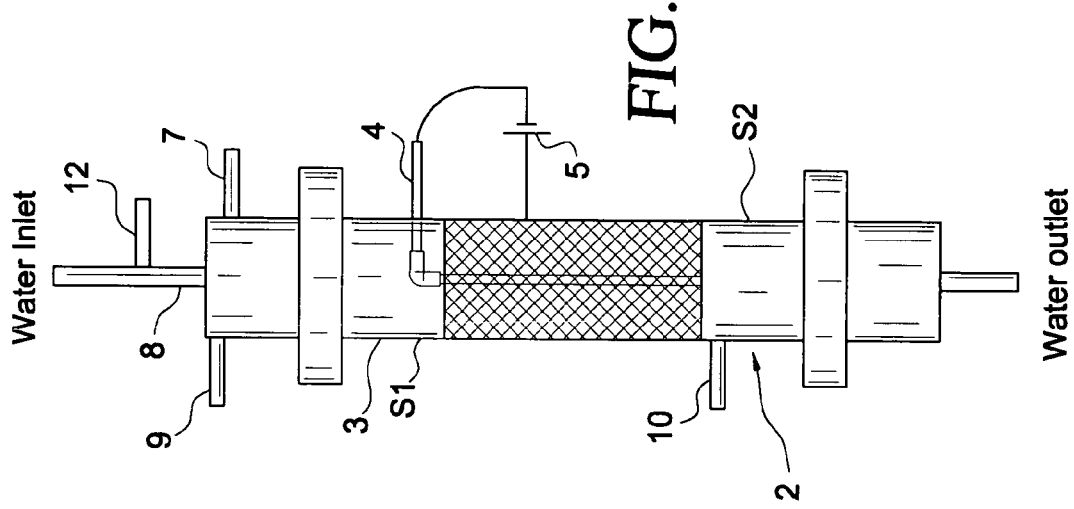
FIG. 1(b) is a schematic diagram of the filter column with a packed bed included in the apparatus shown in FIG. 1(a)
Figure 1A:
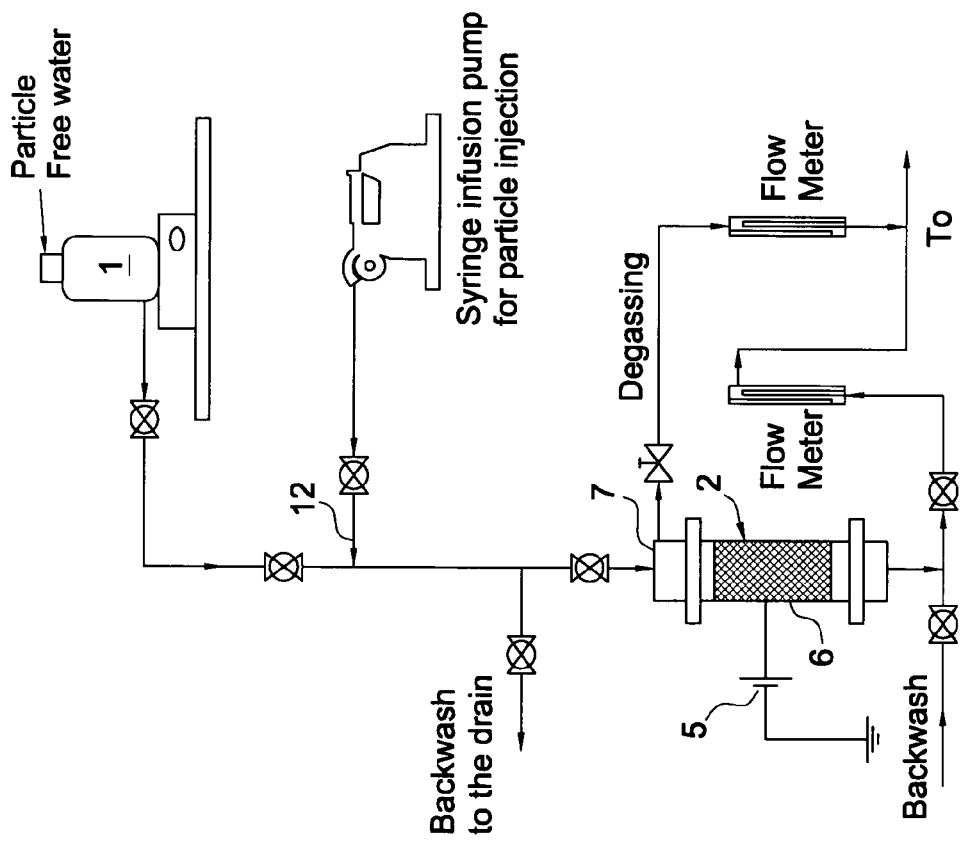
FIG. 1(a) is a schematic diagram of the apparatus of the present invention as used in the working examples which follow.

A schematic diagram of an apparatus as used in the examples is shown in FIG. 1(a). As shown in FIG. 1(a), the apparatus consisted of a constant-level (constant head) overhead tank 1 supplying water to filter column 2 under gravity, so that the pressure head at the inlet of the filter 2 remained the same at all times (~2 m of water). The details of the filter column 2, along with the electrode configuration, are shown in FIG. 1(b). Cylindrical, stainless-steel electrodes are arranged in a configuration with an outer electrode 3 (here, the cathode) surrounding an inner electrode 4 (here, the anode). A constant DC voltage is applied across the electrodes, using a constant-voltage supply 5 (Hewlett Packard, HPE 3630A). Due to the cylindrical configuration, a non-uniform electrical filed is obtained in the annular space between the two electrodes 3 and 4. Granular media filled the annular space between the electrodes completely to a depth of 19 cm to form a packed bed 6 with an upper surface S1 and a lower surface S2. The column 2 was provided with various ports for sampling influent/effluent, pressure measurements, and entry and exit of the particle suspension. A degassing port 7 was provided at the top of the column to vent gases, if any, formed during electrolysis at the electrodes. A constant flow of suspension was maintained through inlet 12 where it mixed with water from tank 1 and then introduced into column 2 through inlet port 8 to ensure a pressurized column free of bubbles. Inlet and outlet pressure heads were monitored using piezometers 9 and 10. Flow meters were used to monitor the flows (Cole Parmer, Model P-03227-30). No coagulants or flocculants were used.

The filter media preferably has a surface charge opposite that of the colloidal particles which are to be removed from the flowing suspension.

All filtration experiments were performed using PF tap water. Table 1 summarizes the properties of the water used. PF water was obtained by filtering the tap water through a series of filters: 25 μm (Cole Parmer # 01509-35), 0.45 μm (Cole Parmer #29830-10) and 0.2 μm (Galman Sciences, #12112). PF water had very few background particles with a mean diameter of 2 μm and a concentration of 10-50 #/mL.

TABLE 1

Physical and chemical characteristics of water medium used to prepare the suspensions

| Parameter | CWW[a] |
|---|---|
| pH | 8.2 ± 0.1 |
| Total hardness as CaCo$_3$ | 154 ± 1.20 |
| Total alkalinity as CaCO$_3$ | 67.6 ± 0.89 |
| Ca (as Ca) | 38.1 ± 0.7 |
| Mg (as Mg) | 14.1 ± 0.4 |
| Chloride | 49.4 ± 1.1 |
| Temperature (° C.) | 22 |
| Fluroide | 0.9860.02 |
| Nitrate as NaNO$_3$ | 4.5 ± 0.3 |
| Sulfate | 110.4 ± 1.1 |
| Sodium | 21 ± 1.1 |
| TOC | 0.51 ± 0.05 |
| Calculated ionic strength (mM) | 7.26 |
| Background particle concentration (#/mL) | <50 (after filtration) |

[a]Cincinnati Water Works Annual Report (1998) (Miller Plant).

Three different filter bed media types were used in the experiments. Fine sand (FS) media (Parry Co., OH) was 0.43-0.60 mm in diameter with a geometric mean diameter of 0.51 mm and a uniformity coefficient of 1.32. Coarse sand (CS) media was (Parry Co., OH) 1.18-1.68 mm in diameter with a geometric mean diameter of 1.41 mm and uniformity coefficient of 1.45. The sand was cleaned and washed with de-ionized (DI) water, soaked in 0.05N HCl solution for 24 hours and dried at 110° C. followed by another thorough cleaning with DI water. The third media type used was dead-burned, milled, technical grade magnesium oxide (MAGCHEM™ P-98, Martin Marietta Magnesia Specialties Inc.) (MgO) and was 0.60-1.18 mm in diameter with a mean of 0.85 mm and uniformity coefficient of 1.48. In-situ media porosity was determined for all the media (by volumetric measurements) and was 0.43, 0.46 and 0.41 for FS, CS and MgO, respectively. An estimate of zeta potential for the media types used, was obtained by pulverizing the large grains into particles with diameters smaller than 30 mm and by subsequently performing electrophoretic mobility measurements (Malvern Zetasizer II). The measured zeta potentials for the three media, viz., FS, CS and MgO are reported in Table 2 and were −20.13, −39.89, and +16.2 mV, respectively.

TABLE 2

| Media | Size | Zeta potential (mV)[k] and lk | Porosity of bed |
|---|---|---|---|
| (a) Filter media characteristics ||||
| Fine sand (FS) | 0.51 | −20.13 ± 1.66 | 0.43 |
| Coarse sand (CS) | 1.41 | −20.09 ± 1.31 | 0.46 |
| Magnesium oxide (MgO) | 0.85 | −00.03 ± 1.39 | 0.41 |

TABLE 2-continued

| Particle | Mean size (μm) | Density (g/cc) | Zeta potential[c] (mV) |
|---|---|---|---|
| (b) Characteristics of colloidal particle used in this study ||||
| Kaolin | 0.778 ± 0.315[d] | 2.6[e] | −15.65 ± 1.33 |
| PSL | 5.1 ± 0.06[f] | 1.064[f] | −22.02 ± 1.05 |
| Cryptosporidium Parvum | 4.0-6.0 | 1.045[g] | −10.33 ± 1.51 |

[a]Malvern Zetasizer II, average of 10 measurements.
[b]Measurements performed at pH = 8, in tap water.
[c]Measurements performed at pH = 8, in tap water, using Malvern Zetasizer II.
[d]Malvern Autosizer II.
[e]Aldrich Chemicals, 1332-58-7.
[f]PS06N/001264 Bangs Laboratories Inc.
[g](Medema et al., 1998).

Three different types of particles were used: (i) Kaolin clay (ii) Polystyrene latex (PSL) microspheres and (iii) C. parvum oocysts. All particle suspensions were prepared using PF water. C. parvum oocysts were obtained from six week-old immuno-suppressed female rat species, following a modified protocol by Yang et al. (1996) and the procedure is described in detail by Dutari (2000). The samples were purified by cesium chloride sodium, resulting in 99% purity. The final oocyst samples were then suspended in phosphate buffer saline solution, pH 7.4 with antibiotics/antimycotic and stored at 4° C. for further usage. C. parvum in suspension with concentrations ~$10^8$ #/mL were obtained and were further diluted as required, such that an influent oocyst concentration of $5 \times 10^3$-$10^4$ #/mL was obtained. Kaolin (~$Al_2Si_2O_5(OH)_4$; Aldrich Chemical Co., 22883-4) suspensions were prepared by mixing the Kaolin clay with the PF water in required amounts and mixing with a commercial grade kitchen grinder for 2 min. This resulted in a uniform clay suspension with a mean diameter of 0.78±0.32 μm. An inlet turbidity of ~10 NTU was used in all experiments. Monodisperse, 5.1 μm PSL particles, with $SO_4$ surface-active groups, were obtained from Bangs Laboratory (#PS06N). Stock suspensions were prepared by dispersing the PSL particles in PF water and sonicating for 10 min. Zeta potential of all particles was measured (Malvern Zetasizer II) in PF water at pH 8 and was −15.65 mV for Kaolin, −22.02 mV for PSL and −10.33 mV for C. parvum particles. Table 2(b) summarizes the characteristics of all the particles used.

Clay suspensions were characterized by measuring the turbidity of the suspension using a turbidimeter (HACH 2100AN). PSL and C. parvum suspensions were characterized by particle number concentrations. Particle counting and sizing was done with optical particle counters (HIAC-Royco, HR-LD150 and Particle Measuring Systems, AAPS 200). C. parvum counting was performed under controlled conditions as per the procedure developed by (Dutari, 2000). C. parvum oocysts could be counted with less than 10% accuracy (compared to enumeration by Immuno fluorescent assay followed by hemacytometer method) and showed up as particles with a geometric mean diameter of 2.1 μm (Dutari, 2000).

All experiments were direct filtration runs and no coagulants or flocculants were used prior to filtration. Before starting the filtrations, the filter media was degassed and backwashed (20% bed expansion) with PF water for 30 min. All the electrical connections between electrodes and power supply were completed. Negative (or positive) potential was applied to the central electrode and the outer electrode was grounded. Before start of the experiment, suspension and influent flow rates were set and the system was allowed to stabilize. At time t=0, the particle injection was started and simultaneously voltage was applied across the electrodes. The inlet and outlet pressure head and flow were monitored with time. A constant flow of 4.8 L/h was maintained through the column in all runs. Samples were collected at predetermined intervals at the inlet, outlet and at the degassing (or gas exit) port. During filtration, in the presence of the electrical field, some gas formation was observed at the electrodes (in the form of fine bubbles); however, it did not disturb the packed bed or the filtration process. The gas bubbles periodically escaped through the gas exit port.

To understand the influence of voltage level on the improvement in collection efficiency, experiments were first performed with Kaolin particles in FS at different voltage levels. Systematic experiments were then performed with Kaolin and PSL particles in three media types (FS, CS and MgO) in the presence and absence of an electric field. PSL particles, due to their physical resemblance with the *C. parvum* oocysts, were used as surrogate particles to investigate influence of electric field. Finally, to obtain enhancement in capture efficiency, experiments were performed with actual *C. parvum* oocysts in FS and MgO columns. Table 3 summarizes all experiments performed, along with the conditions.

TABLE 3

Summary of deposition experiments performed[a]

| Set | Particles | Media | Voltage (V) | Objective |
|---|---|---|---|---|
| I | Clay | FS, MgO | 0, 5, 10, 20 | Study enhancement in capture efficiency of clay particles due to Influence of strength of applied field |
| II | PSL | PS, CS, MgO | 0, 20 | Use PSL as surrogate for *C parvum* and study enhancement Influence of filter media type |
| III | *C. parvum* | FS, MgO | 0, 20 | Study enhancements in capture efficiency of *C. parvum* due to |

[a]For all experiments: Flow = 4.8 L/h, Central electrode-negative, FS = Fine sand; CS = Coarse sand.

Inlet ($C_{in}$) and outlet ($C_{out}$) particle concentration (turbidity for Kaolin) were monitored with time to obtain particle breakthrough curves ($C_{out}/C_{in}$ vs. t). Overall removal efficiency of the bed was defined as:

$$n_{total} = \left(1 - \frac{C_{out}}{C_{in}}\right). \quad (1)$$

Clean-bed single collector efficiency ($n_{exp}$), was obtained from the initial quasi-steady portion of the experimental particle breakthrough curve using the following relation (Yao et al., 1971):

$$n_{exp} = \frac{-4}{3} \frac{a_c}{(1-E)L} \log\left(\frac{C_{out}}{C_{in}}\right). \quad (2)$$

An experimental enhancement factor ($\alpha_{exp}$) was defined as:

$$n_{exp} = \frac{(n_{exp}) \text{ with field}}{(n_{exp}) \text{ without field}}. \quad (3)$$

The enhancement factor indicated the degree of enhancement in collection efficiency when an electrical field was applied. $\alpha_{exp}$ values of 1 indicated that there is no improvement in collector efficiency due to electrical field, whereas values above 1 indicated increase in collection efficiency.

Results

The influence of gas bubble formation at the central electrode on the filtration efficiency of the particles was first examined. Theoretically, particle removal could also take place due to entrapment of particles by the rising gas bubbles—a mechanism somewhat similar to air floatation. To investigate role of this mechanism, particle concentration was monitored at the inlet, gas exit port, and outlet of the column during filtration experiments (in the presence of electric field) . In all experiments the particle concentration at the inlet to the filter column was same as that at the gas exit port, indicating that colloid particle removal by a 'floatation' mechanism is negligible. Thus removal efficiency was entirely attributed to deposition on the filter collector medium.

Effect of Applied Voltage on Capture Efficiency

Residual concentrations at the inlet and outlet of the filter column were measured with time, in the presence and absence of electric field, to determine the degree of improvement in collection. Polarity of the electrodes did not have any significant influence on the removal efficiency. In the absence of an electric field, head loss in the column was insignificant as particles were collected with a low efficiency. In the presence of an electric field, however, the head loss increased by approximately 50% due to enhanced collection of particles.

The influence of strength of the external field on the removal efficiency of Kaolin particles was first experimentally studied by varying the applied voltage. FIG. 2 shows residual concentration (averaged over the first 60 min) of Kaolin particles in the outlet of FS column at various voltages. The residual concentration decreases with increasing voltage as expected. The inset plot in FIG. 2 shows experimental single collector efficiency ($n_{exp}$) as a function of dimensionless electrophoretic velocity ($u_E/U_{inf}$) of Kaolin particles. The inset plot shows that $n_{exp}$ increases linearly with $u_E/U_{inf}$ initially and then reaches a saturation value at high $u_E/U_{inf}$. The initial slope of curve $$\left(\text{i.e., } \frac{dn_{exp}}{d(u_E/U_{inf})}\right)$$

is about 1.72. Judd and Solt (1989) observed a linear increase in $n_{exp}$ with ($u_E/U_{inf}$) over a wide range of electrophoretic mobility. They reported this slope to be in the range of 0.23-0.28 for negative polarity (electric field and flow acting in opposite directions) and 0.36-0.44 for positive polarity (electric field and flow acting in the same direction). Parallel plate configuration of electrodes with a fibrous filter media in between was used in their work. The higher value of $$\left(\text{i.e., } \frac{dn_{exp}}{d(u_E/U_{inf})}\right)$$

in this study is believed due to the orientation of the electrical field perpendicular to the flow direction, demonstrating that the orientation of the electric field, relative to macroscopic flow direction, plays an important role. For instance, Judd and Solt (1989) observed that collector efficiencies are about 67% greater when the electric field was oriented along the flow, compared to that when it was acting in the opposite direction. Other studies have mostly used external field direction parallel flow direction and gravity (Judd and Solt, 1989 and Judd and Solt, 1991; Zhang et al., 2000). Theoretical calculations also show that maximum improvement can be observed when the field is oriented perpendicular to the flow direction. FIG. 3(b) shows enhancement factor calculated using the trajectory approach described earlier as a function of angle of orientation of electric field (relative to macroscopic flow velocity). Theoretical enhancement factor $\alpha_{ther}$ was defined, similar to $\alpha_{exp}$, as the ratio of theoretical collector efficiencies with and without electric field. At high field strength, maximum enhancement is observed when the field is oriented perpendicular to the mainstream flow direction. In the present invention, due to the electrode configuration and the generally linear flow path of the liquid through the packed bed, macroscopic field direction (in the absence of media) is inherently perpendicular to the flow path or direction. The presence of granular media may further lead to redistribution of the local field in pore interstices.

Figure 2A:
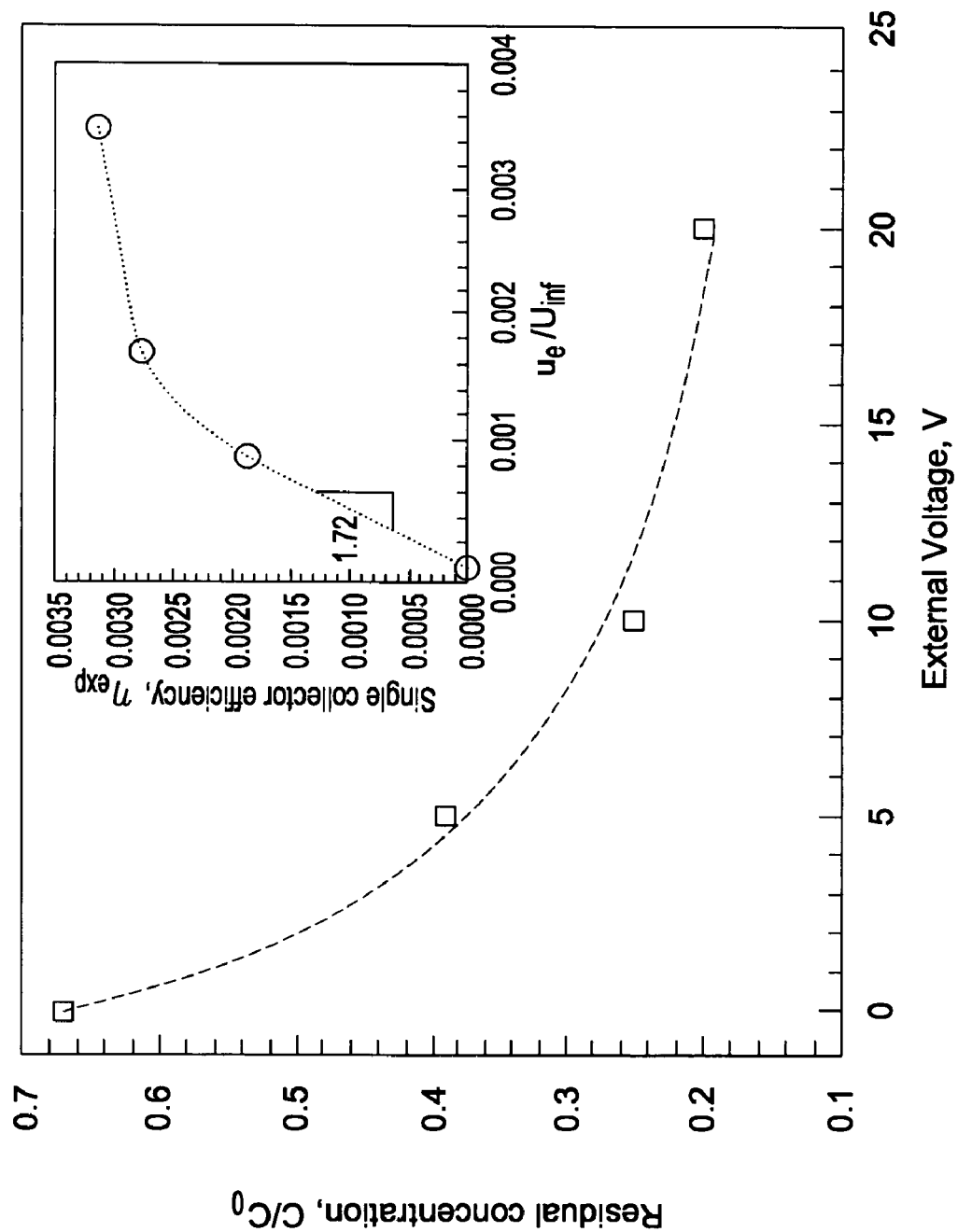
FIG. 2(a) is a graph of residual concentrations of Kaolin particles ($C_{out}/C_{in}$) at the outlet of a fine sand packed bed "FS" at different applied voltages.
Figure 2B:
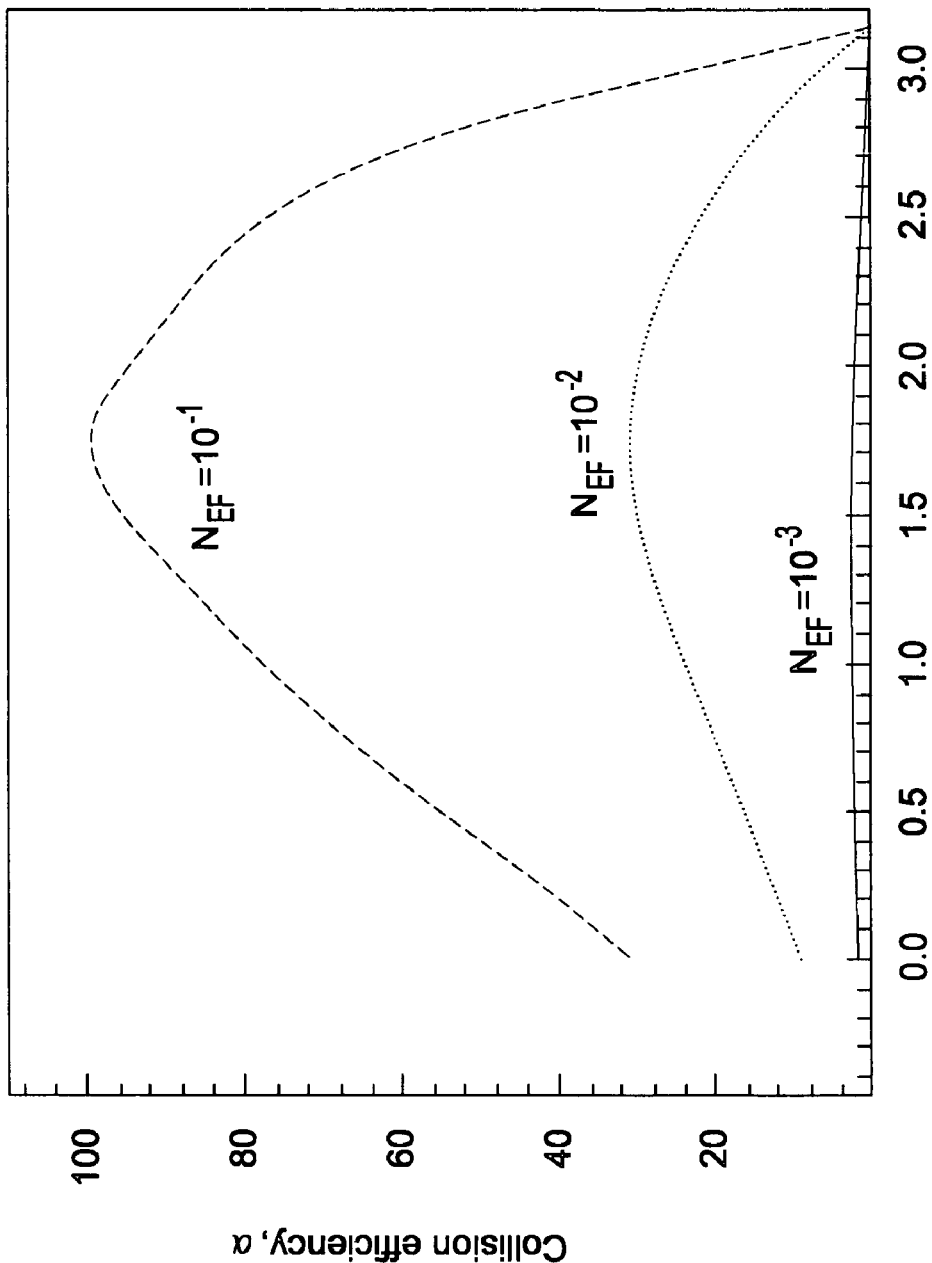
FIG. 2(b) shows variation in single collector efficiency (n) as ƒ function of orientation angle (φ, relative to direction of flow) and electric field group ($N_{EF}$)

FIG. 2(a) shows that the rate of decrease in residual concentration decreases at higher voltage. The smaller improvements in removal at higher fields could possibly be due to interfering electrokinetic processes in the filter bed (such as electroosmosis at the collector surface, electrolysis at the electrode surface, etc.). For instance, as the field strength increases, the rate of electrolysis at the electrode surface also increases. This further 'shields' the electrodes and thus the effective field in the interior of the bed decreases.

Figure 2C:
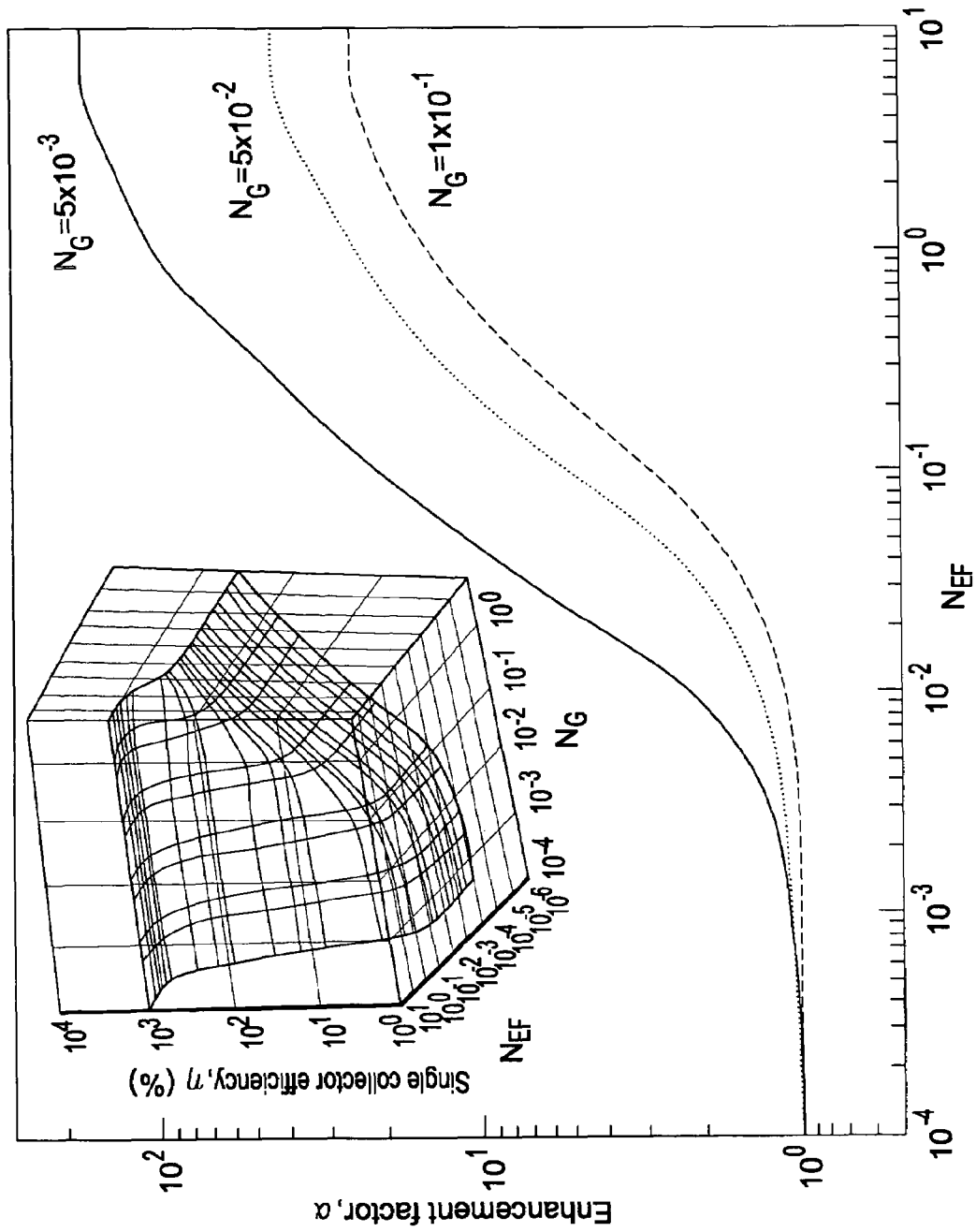
FIG. 2(c) shows variation in single collector efficiency ($n_{ther}$) as a function of gravity group ($N_G$) and electric field group ($N_{EF}$).

In order to explore the influence of electrical field ($N_{EF}$) on the capture efficiency, calculations were performed using the trajectory approach. Enhancement factors were obtained as a function of $N_{EF}$ at different values of $N_G$. It should be pointed out that, low value of $\alpha$ does not imply low collector efficiency and is only an indicator of degree of enhancement sought by electric field for a given particle and collector properties. FIG. 3c shows a plot of variation in enhancement factor ($\alpha_{ther}$) as a function of electrical force ($N_{EF}$) at different values of gravitational force ($N_G$). Also shown in the inset is a plot of variation of theoretical single collector efficiency ($n_{ther}$) as a function of $N_{EF}$ and $N_G$. FIG. 2(c) shows that for any given $N_G$, the enhancement factor ($\alpha_{ther}$) increases with increasing electrical field strength and reaches a saturation value at sufficiently high $N_{EF}$ (~10). The rate of increase in $\alpha_{ther}$ is maximum between the $N_{EF} \approx 0.01$ and 1. Also, at any given value of $N_{EF}$, $\alpha_{ther}$ increases with decreasing $N_G$. The electrical forces are thus most effective when other mechanisms of particle capture (e.g., inertial) are less dominant.

Effect of Media on Efficiencies

Figure 3:
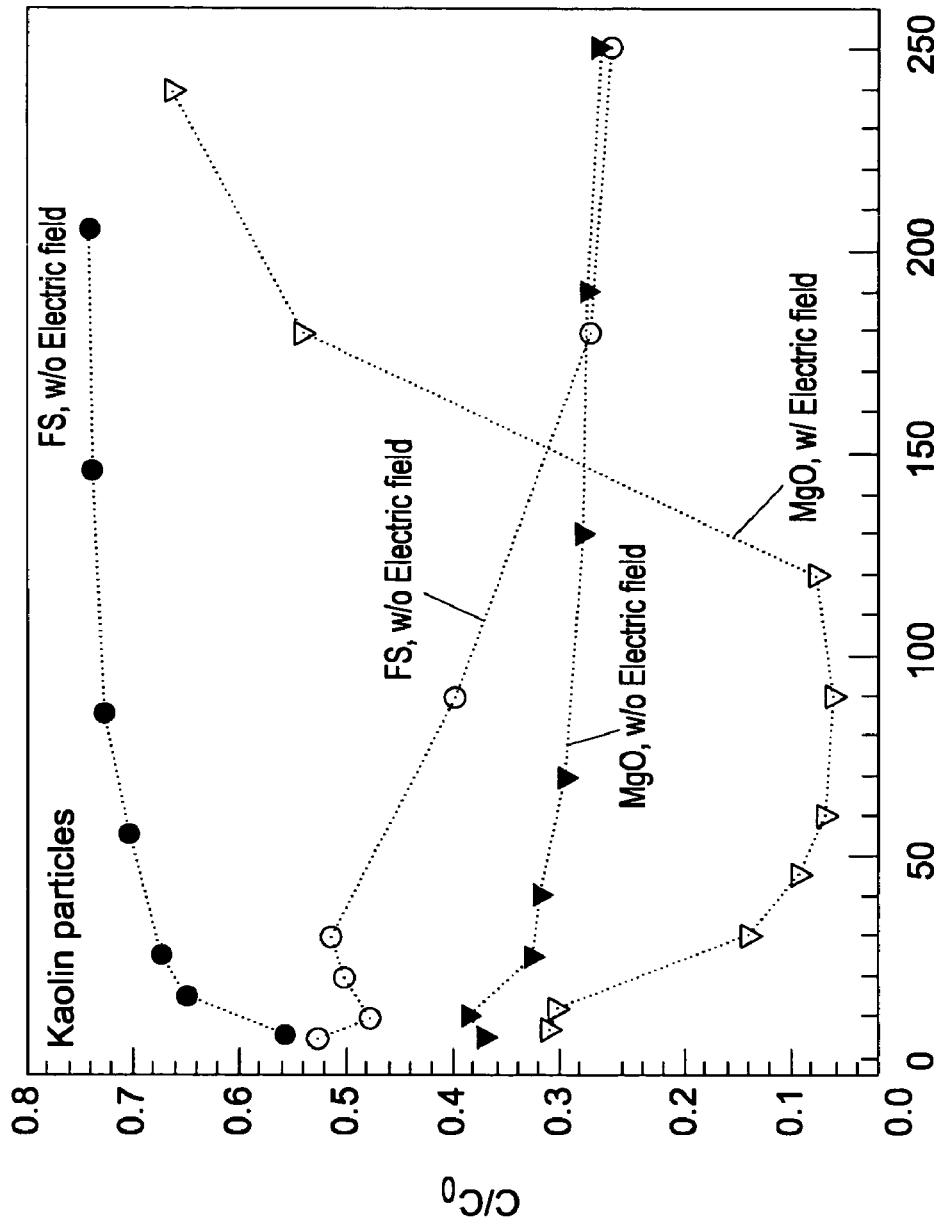
FIG. 3 is a graph of formalized residual concentrations ($C_{out}/C_{in}$) of Clay particles at the outlet of the filter column with time in FS and MgO beds showing that removal clearly increases due to application of an electrical field.
Figure 4:
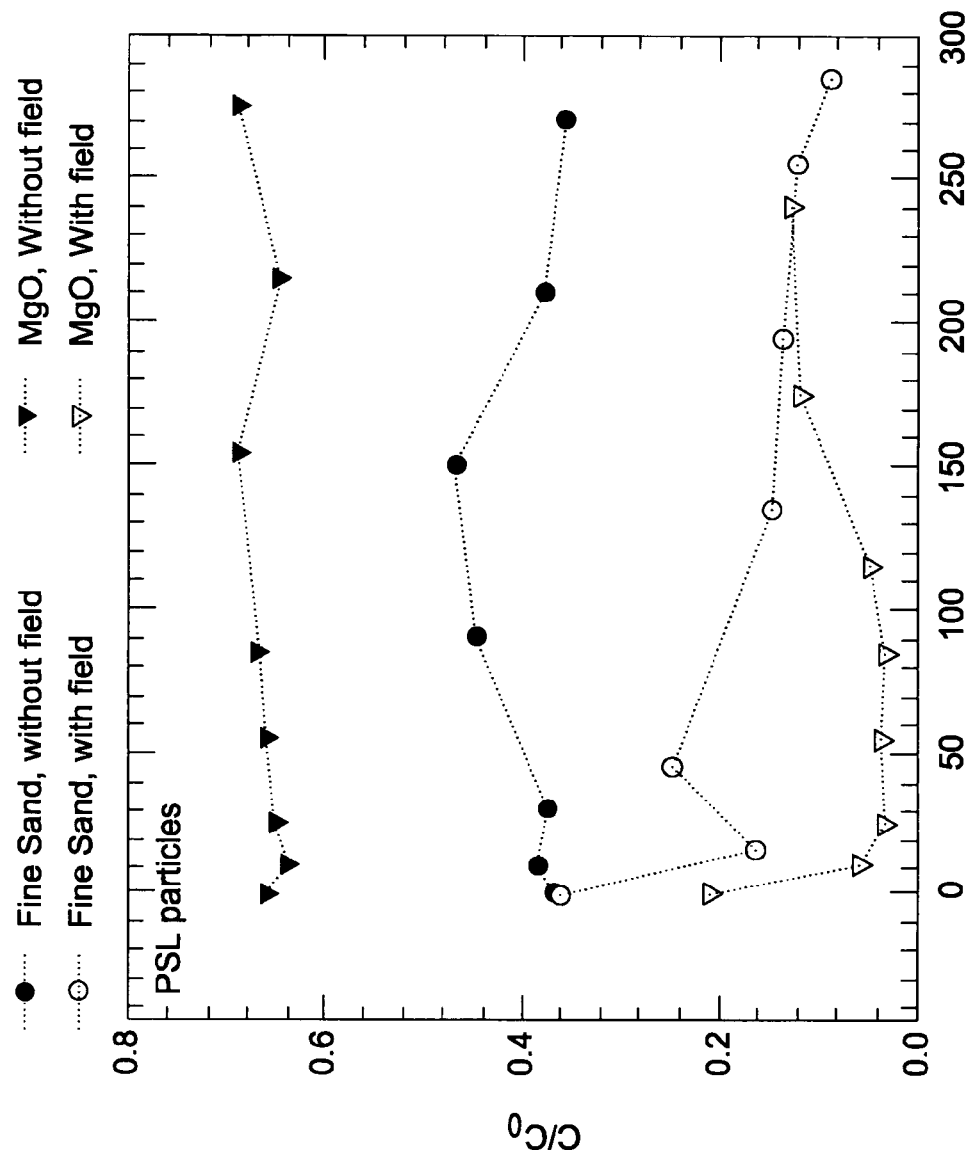
FIG. 4 is a graph of normalized residual concentration ($C_{out}/C_{in}$) of PSL particles at the outlet of FS and MgO columns versus time.

FIG. 3 shows a plot of residual concentration of Kaolin at the outlet of FS and magnesium oxide (Mg)) columns, in the presence and absence of an electric field. A negative potential of 20 V was applied to the central electrode. In all cases, there was considerable improvement in removal efficiency due to the applied electric field. Deposition rate of Kaolin in FS in the absence of an electric field decreased with time (residual concentration increases with time) due to unfavorable particle—surface interactions (particle and collector surface are both negatively charged). However, in the presence of the external field in FS, residual concentration of Kaolin particles rapidly decreased. Removal efficiency (averaged over the first 60 min) increased by a factor of ≈1.5. In case of the MgO column, residual concentration decreased from ~30% to about 4% in the presence of the electric field, a factor of 1.4 increases in removal efficiency. The overall removal efficiency of Kaolin decreased in the following order—$n_{On}^{MgO,On} > n^{MgO,OFF} > n^{FS,ON} > n^{FS,OFF}$ FIG. 4 shows variation in residual concentration of PSL particles with time for FS and MgO columns in the presence and absence of an electric field. Again, residual concentration is higher in the absence of an electric field, and rapidly decreases in the presence of an electric field. Removal efficiency increased from 60% to 81% in FS and from 35% to 96%, a factor of 2.7 increase, in the MgO column. Enhancement was higher in MgO compared to that in a FS column. Table 4 also lists $n_{exp}$ and $n_{ther}$ for PSL particles, in the presence and absence of an electric field. Efficiencies are substantially overestimated by the trajectory calculation in the presence of an electric field, possibly due to overestimation of the electric field in the annular space.

Figure 5:
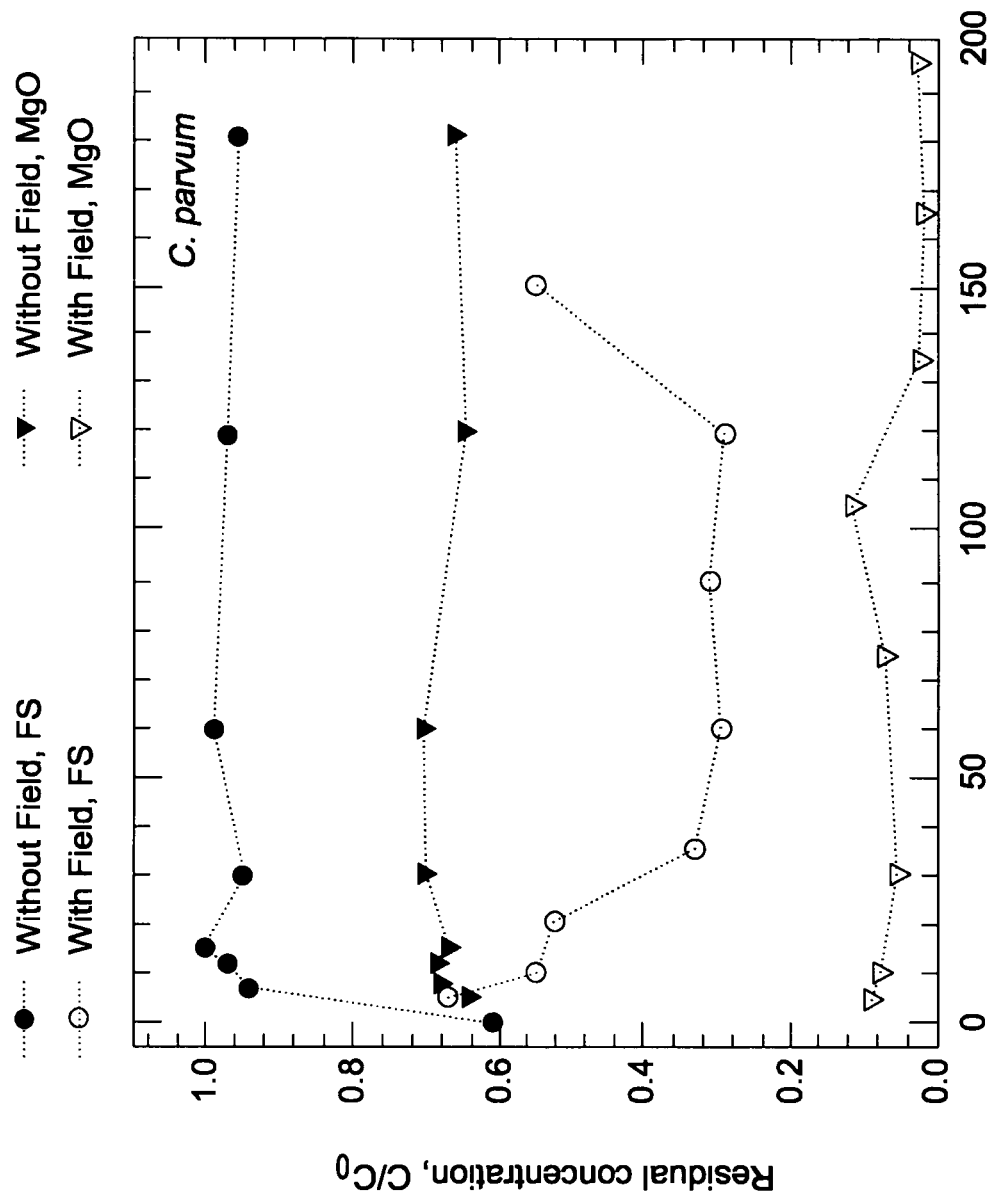
FIG. 5 is a graph of normalized residual concentration (($C_{out}/C_{in}$) of *C. parvum* particles at the outlet of FS and MgO columns.

FIG. 5 shows the residual concentration of C. parvum oocysts at the outlet of FS and MgO columns. In the absence of an electric field, removal efficiency in FS was approximately 10% (averaged over the first 60 min) and increased to about 70% when an electric field was applied, an increase by a factor of ≈7. In the MgO column, the removal efficiency increased from ≈30% to 90% when the field was applied. Also, removal in MgO (in the absence of field) was greater; possibly due to favorable surface conditions (collector and particle were oppositely charged).

CONCLUSIONS

An external DC electric field resulted in significant improvement in the removal of test particles (Kaolin and PSL) and the *Cryptosporidium* oocysts in three different types of media-FS, CS, and MgO. *C. parvum* removal increased from 10% to 70% due to application of field in FS media and from 30% to 90% in a MgO column. The MgO column proved to be a better media due its high removal capacity, with and without electric field.

The present invention offers an advantage over conventional filtration in that the removal efficiency in the presence of an electric field is relatively insensitive to variation in particle size and concentration. As a result, particles of various sizes, including *C. parvum*, can be removed with relatively high efficiency. The method can be used as a good augmenting method in water treatment plants. Also, it is particularly applicable for treatment of groundwaters where chemical coagulation-based systems would be impractical and undesirable. Also, the method has potential application in rural package treatment units and can be operated economically using solar or wind energy sources. On the other hand, the technique is restricted in its application to low to medium conductivity suspensions, if it is to be an energy efficient method.

Although the present invention has been described above with reference to specific embodiments, the present invention is not limited to those specific embodiments described above, and various modifications are possible without departing from the spirit and scope of the invention.

We claim:

1. A method for filtering water to remove biocolloids, in the form of colloidal particles and having a surface charge from water, the method comprising:

providing a packed bed of a granular filter media in an annular space defined between two concentric cylindrical electrodes, the packed bed having an inlet and outlet;

introducing the water through the inlet onto an upper surface of the packed bed to create a flow of water through the packed bed and to separate the colloidal particles from the water, whereby water with a reduced biocolloid content exits through the packed bed outlet; and applying a DC electric voltage across the electrodes to create a DC electric field across the electrodes to enhance deposition of the biocolloids on the granular filter media of the packed bed.

2. A method according to claim 1 further comprising:

introducing water into the outlet while simultaneously reversing the polarity of the applied voltage to force the biocolloids away from the granular media for removal of the biocolloids through the inlet, thereby rejuvenating the granular media.

3. A method according to claim 1 wherein the applied DC electric field increases electrophoretic velocity and cross-flow electroosmotic velocity of the biocolloids to enhance the capture.

4. A method according to claim 1 wherein the biocolloids are *Cryptosporidium parvum* oocysts.

5. A method according to claim 1 wherein the DC electric field is oriented perpendicular to direction of water flow between the inlet and outlet.

6. A method according to claim 1 wherein the applied DC voltage is a constant DC voltage.

7. A method according to claim 1 wherein the flow of water through the packed bed is substantially constant and substantially bubble-free.

8. A method according to claim 1 wherein no coagulant or flocculant is used.

9. A method according to claim 1 wherein the granular filter media is MgO.

10. A method according to claim 1 wherein the biocolloids have a particle size of 0.1 to 0.001 micron.

11. A method according to claim 1 wherein the granular filter media comprises MgO or sand.

* * * * *